United States Patent [19]
Gonda

[11] Patent Number: 5,193,484
[45] Date of Patent: * Mar. 16, 1993

[54] ELECTRODE STRUCTURE FOR COLLAR MOUNTED ANIMAL TRAINING APPARATUS

[75] Inventor: Gerald J. Gonda, Tuscon, Ariz.

[73] Assignee: Tri-Tronics, Inc., Tucson, Ariz.

[*] Notice: The portion of the term of this patent subsequent to Mar. 31, 2009 has been disclaimed.

[21] Appl. No.: 859,080

[22] Filed: Mar. 27, 1992

Related U.S. Application Data

[63] Continuation of Ser. No. 578,562, Sep. 6, 1990, Pat. No. 5,099,797, which is a continuation of Ser. No. 463,359, Jan. 11, 1990, abandoned, which is a continuation of Ser. No. 235,784, Aug. 22, 1988, abandoned, which is a continuation of Ser. No. 935,501, Nov. 26, 1986, abandoned.

[51] Int. Cl.⁵ .......................... A01K 15/00
[52] U.S. Cl. .................................. 119/29
[58] Field of Search ............... 119/29, 106, 108, 130; 54/71; 273/84 ES; 361/232

[56] References Cited

U.S. PATENT DOCUMENTS

| | | | |
|---|---|---|---|
| 3,161,005 | 12/1964 | Ackerson | 54/71 |
| 3,509,693 | 5/1970 | French | 54/83 |
| 3,589,337 | 6/1971 | Doss | 119/29 |
| 3,687,112 | 8/1972 | Henderson | 119/29 |
| 3,777,771 | 12/1973 | Gardner et al. | 119/29 |
| 4,335,682 | 6/1982 | Gonda et al. | 119/29 |
| 4,794,402 | 12/1988 | Gonda et al. | 343/895 |

Primary Examiner—Gene Mancene
Assistant Examiner—Thomas Price
Attorney, Agent, or Firm—Cahill, Sutton & Thomas

[57] ABSTRACT

An electroshock apparatus mounted on a strap placed around a portion of an animal's body includes first and second electrodes each extending through the strap from remotely controlled electroshock circuitry supported by the strap, and inserted through insulators surrounding shanks of the electrodes. The tips of the electrodes extend sufficiently far beyond the ends of the respective insulators to 1) ensure consistent electrical contact of the first and second electrodes with the animal's skin without overtightening the strap, and 2) avoid substantial shunting of electrical stimulus current between the first and second electrodes through wet fur.

4 Claims, 2 Drawing Sheets

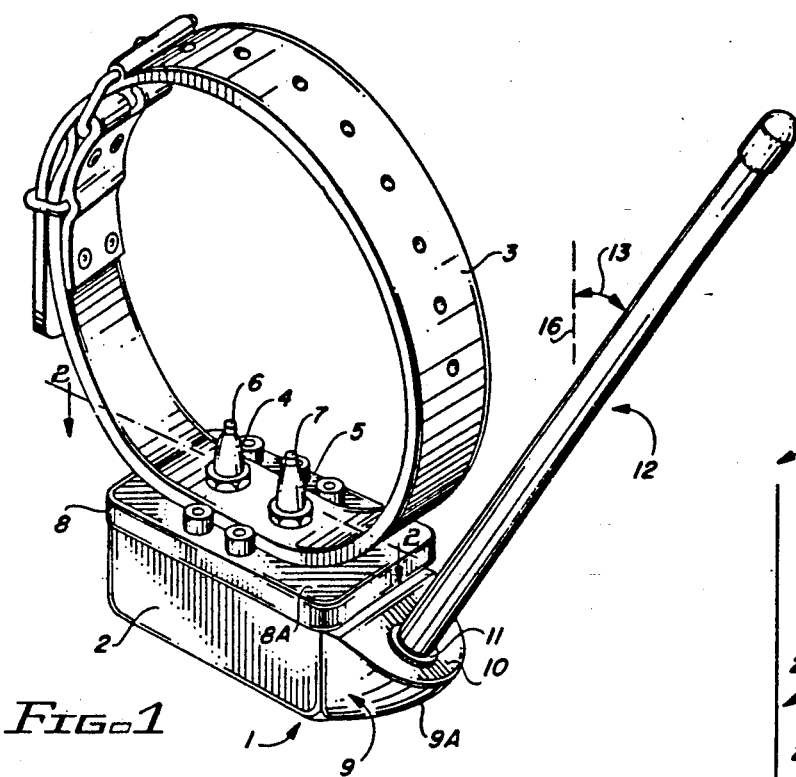
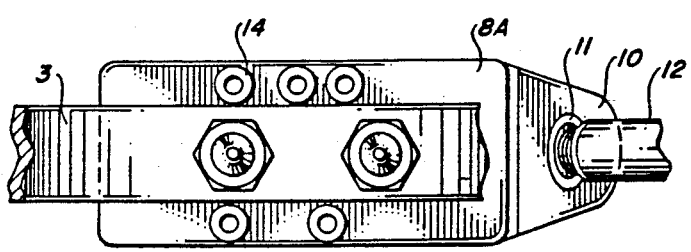
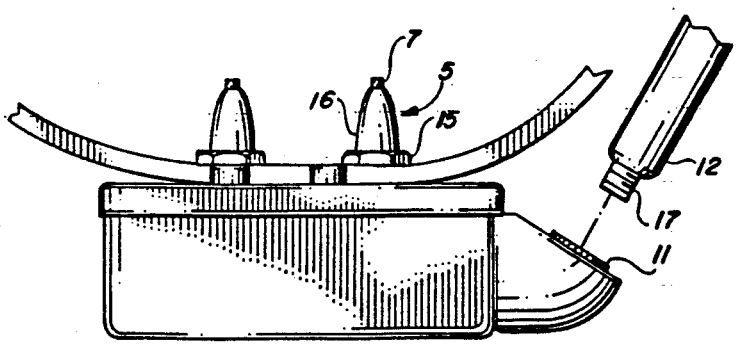
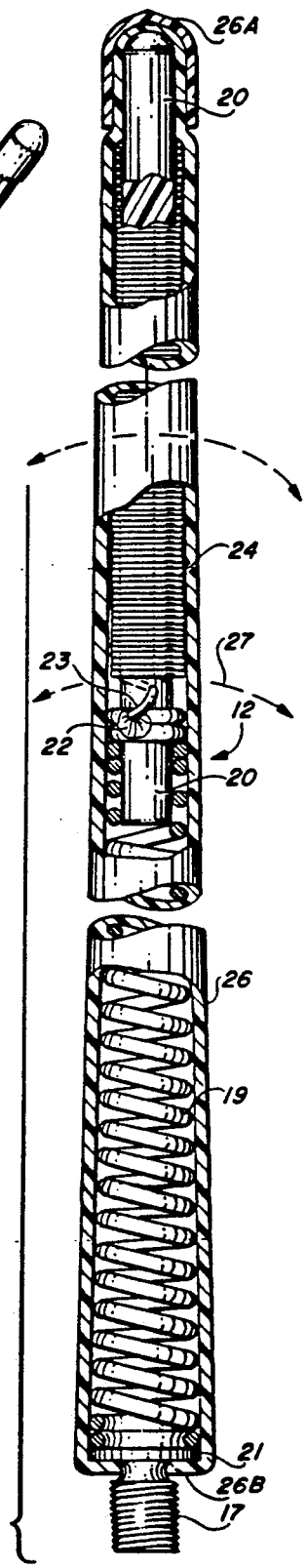

ELECTRODE STRUCTURE FOR COLLAR MOUNTED ANIMAL TRAINING APPARATUS

This is a continuation of application Ser. No. 578,562, filed on Sep. 6, 1990, now U.S. Pat. No. 5,099,797 which is a continuation of Ser. No. 463,359, filed Jan. 11, 1990, now abandoned, which is a continuation of Ser. No. 235,784, filed Aug. 22, 1988, now abandoned, which is a continuation of Ser. No. 935,501, filed Nov. 26, 1986.

BACKGROUND OF THE INVENTION

Various electronic training aids are known for enabling a dog trainer to immediately encourage or discourage various dog behavior when the dog is off leash. Generally, the dog trainer carries a transmitter capable of sending radio signals to a receiver unit supported beneath a collar around the dog's neck enabling the dog trainer to apply stimuli to the free moving dog. The state-of-the-art is generally indicated by the present assignee's publication "Understanding Electronic Dog-Training" by Dr. Daniel F. Tortora, 1982, the assignee's Model A1-70, Model A1-80, and Model A1-90 remote trainer systems and MBL bark limiter mannuals, assignee's U.S. Pat. Nos. 4,202,293 and 4,335,682, and Patent 2,800,1004 (Cameron et al.).

The effectiveness of using the known animal training devices is limited by the portability and range of such systems, which in turn depend on the power output of the transmitter and the sensitivity of the receiver. Increasing the power output of the transmitter leads to rapid discharge of batteries in the portable transmitter devices, which is highly undesirable. Increasing the size or number of the transmitter batteries would be impractical, as the transmitter unit needs to be as small and light as possible. The transmitters of assignee's prior system produce only about 0.2 watts of output power, and hence do not cause a heavy power drain from the batteries. In applicant's prior devices, the receiver antenna is woven into the collar that supports the receiver unit about the dog's neck. The above-mentioned Cameron et al. patent shows a receiver unit supported on a dog's back by a harness. A rigid antenna is rigidly mounted on top of the receiver unit and extends upwardly from the back of the dog. This device is very impractical for long range purposes, as it is non-resonant and therefore very inefficient. Furthermore, as dogs often run under fences, through brush, etc., especially if distracted by a rabbit or a cat or the like, the rigid antenna of the Cameron et al. device is likely to be bent or damaged.

All electronic animal training devices of the type described above of which we are aware have a mean range limited to approximately one-quarter of a mile from the transmitter, under fairly ideal conditions. There usually are "gaps" or "radio dead spots" in the range of the prior devices, wherein the reliable range is substantially less than one-quarter of a mile. Such gaps in the one-quarter mile range can be caused by variations in the terrian, the orientation of the dog, orientation of the transmitter, and other factors. Therefore, as a practical matter, the prior electronic training devices are nearly 100% reliable only within one-eighth of a mile. Such "gaps" in the range of the unit can be very harmful to the progress of training an animal, because, as explained in the above Tri-Tronics publication by Dr. Tortora, effective training of a dog requires precise timing of the training stimuli. While in some instances the range of prior electronic dog training devices is satisfactory, in other instances, it is not. Competitors in this industry have expended considerable effort and investment in trying to devise a practical electronic dog training system that extends the range. Until now, such attempts have fallen short. One approach has been to increase transmitter power, but since the range is proportional to the square root of the power of the transmitter, this approach requires a large increase in the transmitter output power, greatly increasing battery power consumption therefore substantially increasing the size and weight of the transmitter unit by requiring larger battery packs. Other approaches have included attempts to attach stiff rod antennas to the receiver unit under the dog's collar so that the rod antenna extends along side the dog's neck and above the level of his back. Such attempts have been inadequate. First, to be efficient for dog training purposes, an antenna should be resonant at the operating frequency. Dogs frequently shake their heads vigorously, especially if they become wet, and a stiff rod antenna becomes very dangerous to persons and/or other dogs that might be nearby.

Furthermore, prior attempts at running a rod-type antenna past the dog's neck have not adequately increased the range, probably because of the close proximity to the dog's neck, which results in coupling some of the received energy directly to the dog's neck instead of to the receiver and also results in some detuning of the antenna circuit. Also, the presence of an antenna extending from a dog will alter the dog's judgment as to how close it can pass by an object without the antenna hitting the object. This can cause the dog to give excessive leeway when passing an object. Obviously, such a large rod antenna would be impractical. The harness-supported receiver in the above-mentioned Cameron et al. reference is impractical because of the inconvenience of putting a harness on a strong, squirming dog and because of the likelihood of breaking off the antenna disclosed in that reference if the dog runs or crawls under a tree branch or a fence or the like in pursuit of a rabbit, cat, etc.

The state-of-the-art is such that those skilled in the art mostly have accepted the disadvantages inherent in using rigid wire or rod antennas as a means to increase the range of remote electronic dog training devices of the type referred to, and have accepted the fact that the high cost and/or high level of inconvenience associated with the various options for increasing the transmitter range, such as increasing transmitter power, increasing receiver sensitivity, extending stiff rod antennas from neck-mounted receivers, etc., are not practical in view of the benefits that can be attained thereby.

SUMMARY OF THE INVENTION

It is an object of the invention to provide an optimum insulated electrode structure for a collar-supported electroshock apparatus which prevents shunting of electroshock current by wet fur of an animal, yet maintains a good level of electroshock stimulus even though the collar may be slightly loose.

In one described embodiment of the invention, partially insulated electrodes connected to the received unit extend a sufficient distance beyond the insulation toward the neck of the dog to allow reliable controlled electroshock when the dog is very dry or very wet, even if the collar is slightly loose.

BRIEF DESCRIPTION OF THE DRAWINGS

FIG. 1 is a perspective view of the animal training collar-mounted receiver assembly of the present invention.

FIG. 2 is a section view taken along section line 2—2 of FIG. 1.

FIG. 3 is a partial side view illustrating the antenna mounting base and the antenna structure of the device shown in FIG. 1.

FIG. 4 is a partial cutaway view illustrating the internal structures and plastic sheath of the antenna.

DETAILED DESCRIPTION OF THE INVENTION

Figure 5:
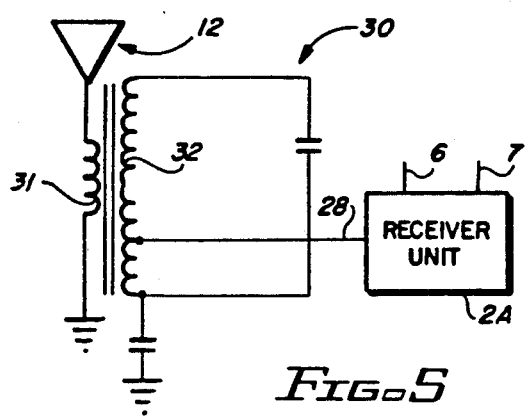
FIG. 5 illustrates a circuit coupling the receiver input to the antenna.

Referring now to the drawings, remotely controlled collar-mounted receiving unit 1 includes an RF receiver unit 2 with a cover 8. An RF receiver unit 2A (FIG. 5) inside unit 2 produces electroshock voltages which are applied to electroshock electrodes 6 and 7. A suitable battery (not shown) is contained within receiver unit 2. A typical dog collar strap 3 has its lowest portion attached to the upper surface 8A of cover 8 by means of nut flanges on the bases of electrodes 6 and 7 which are threaded onto conductive studs connected to the outputs of receiver unit 2A. A helically wound antenna unit 12 is attached at its base to a socket 11 rigidly supported by a sloped surface 10 of an antenna support base 9.

The sloped surface 10 is inclined approximately 20 to 30 degrees below the plane of cover surface 8A. Antenna 12 is threaded into a threaded recess 11 and is perpendicular to sloped surface 10, so that antenna unit 12 is inclined approximately 20 to 30 degrees relative to an imaginary vertical reference line indicated by dotted line 16. Reference numeral 13 designates the angle referred to.

The details of the receiver unit 2A can be similar to those disclosed in assignee's U.S. Pat. No. 4,335,682, issued Jun. 22, 1982, by Gonda et al, and incorporated herein by reference.

In accordance with the present invention, antenna unit 12 is a helically wound antenna that is only approximately eight inches long, although antenna length of five to ten inches is practical. The receiver unit operates at the FCC-allocated frequency of about 27 megahertz.

Referring to FIG. 4, the antenna unit 12 includes a conductive threaded stud 17 integral with a base 21, which is soldered to the lower end of a helical, conductive spring-coil conductor 26, which has approximately 30 turns. The length of the lower section of antenna 12 consisting of spring-coil conductor 26 is approximately three inches.

The elasticity of coil-spring 19 is such that if antenna unit 12 strikes an object such as the branch of a tree or bush or strikes a fence as the dog runs in pursuit of a rabbit, for example, coil-spring conductor 19 will elastically deform to allow the upper end of antenna 12 to pass under or around the obstacle without causing damage to the antenna 12 or to the antenna receiving base 9 or the threaded socket 11, into which stud 17 is tightly threaded. The elasticity of spring 19 is also selected such that when the unit is worn by a large, vigorous dog, the antenna unit 12 can withstand the very vigorous shaking that such a dog typically performs when it climbs out of the water and shakes itself free of excess moisture. If the elasticity of coil-spring conductor 19 is too low, such a vigorous shaking can result in permanent outward bending of the coil-spring 19, which is highly undesirable, since a more nearly horizontal orientation of antenna unit 12 would not as effectively "pick up" signals transmitted by a remote transmitter unit (the antenna of which is normally held vertically by the user).

The upper end of helical spring-coil conductor 19 is connected by solder 22 to the lower end of a 28 gauge enamel covered copper wire conductor 23 that is tightly wound around a solid, 0.23 inch diameter cylindrical insulating rod 20. The uppermost three or four turns of spring-coil conductor 26 are tightly wound around the lower end of insulating rod 20. Insulating rod 20 extends all the way to the uppermost end of the antenna unit 12, and the copper wire winding, generally designated by reference numeral 24, contains approximately 380 turns. The length of the upper section of the antenna including insulating rod 20 is about 4 and ¾ inches. The mush higher number of turns around the upper half of the antenna structure produces what is known as a "top-loaded" antenna structure, which has much higher inductance at the upper portion thereof.

A thick plastic sheath 26, completely sealed at its top end 26A, but having a hole 26B at its bottom end, ensheaths the helically wound conductors 19 and 24. The sheath 26 prevents damage due to moisture to the windings, especially the upper windings 24, if the dog causes the antenna unit 12 to sharply strike a fence wire, a branch of a tree, or the like.

Figure 6:
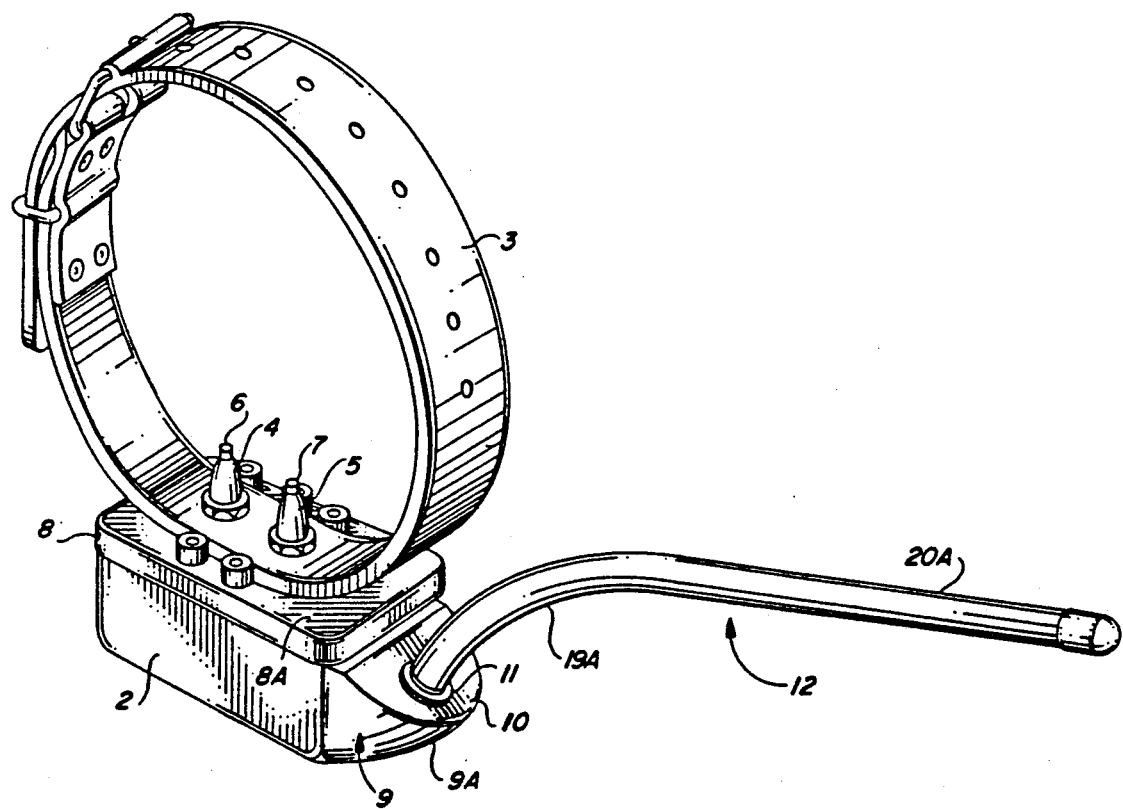
FIG. 6 is a perspective view similar to FIG. 1 showing flexing of the lower portion of the antenna.

FIG. 6 shows how the antenna unit 12 can bend at its lower portion 19A, while the upper stiff portion 20A remains relatively straight.

The described structure is highly resistant to damage despite the very large forces that may be imparted by the antenna 12 to various objects as a result of the vigorous movement of a typical large dog.

FIG. 5 shows a tank circuit 30 that includes a winding 32 that is magnetically coupled to a winding 31 connected in series with the conductors of the antenna unit 12, which is schematically designated in the manner shown in FIG. 5. The input 28 of receiver unit 2A is connected to a tap of the transformer including windings 31 and 32.

The above described structure solves the previously mentioned problems associated with prior attempts to extend the range of remote controlled electronic dog training devices. The above described device has been thoroughly tested, and has been found to provide an average range of approximately one mile from the remote transmitter unit, wherein the trainer can provide training stimuli to the dog. The zone of nearly 100% reliability wherein the above mentioned "gaps" in the range are eliminated has been extended from approximately one-eighth of a mile for prior units to anywhere within about a one-half mile radius of the transmitter unit. This has been achieved without making any changes in the remote transmitter unit or increasing the battery size or power output thereof. The improved range also has been accomplished without use of a large stiff antenna, avoids large stresses due to vigorous shaking, running through brush, etc., by a typical dog. No substantial change has been made to the pre-existing receiver circuitry, except optimizing the coupling of the receiver circuit to the antenna by inductive coupling instead of by capacitive coupling. The losses of received RF energy by capacitive coupling to the neck of the dog has been greatly reduced over prior receiver antennas for electronic dog training devices. The easily removability of the threaded antenna in the field is a significant advantage.

In accordance with another aspect of the present invention, improved electrodes 6 and 7 have been provided by causing their upper ends to protrude approximately 0.1 inches above the upper ends of plastic insulators 4 and 5, respectively. The closest prior electrodes consists of units in which the ends of electrodes 6 and 7 scarcely protrude from the upper ends of the plastic insulators 4 and 6. This prior design was provided by the applicants in an attempt to enable the receiver unit to apply electroshock stimulus signals to the animal's neck when the dog is soaking wet. The earliest electrodes had no insulation such as 4 and 5 at all. Those electrodes used by the applicants were found to be ineffective if the dog was soaking wet because of the large parallel resistance between the two electrodes by the wet, conductive fur of the dog. The parallel resistance shunted a large portion of the electroshock current away from the neck of the dog, greatly decreasing the shock stimuli actually applied to the neck of the dog. By providing insulative housings around all but the extreme upper tip of the electrodes, it was found that the above parallel resistance were minimized. Adequate electroshock signals were applied to the dog both when it was dry and when it was soaking wet. However, it was found that if the collar was less than quite tightly disposed about the dog's neck, the electroshock stimulus was ineffective. Many users failed to tighten the collar as tight as necessary.

In solving this problem for most short-haired dogs, we have found that by extending the tips 6 and 7 approximately 100 mils above the insulators 4 and 5, and providing a diameter of the tips of about one-eight of an inch, effective electroshock stimulus can be applied to the dog's neck regardless of whether the dog is dry or soaking wet or swimming in water, even if the collar is not quite as tight as would be necessary with the prior electrodes. For long-haired dogs, the tips 6 and 7 should extend as much as about one-fourth of an inch above the insulators.

While the invention has been described with reference to a particular embodiment thereof, those skilled in the art will be able to make various modifications of the described embodiment without departing from the true spirit and scope of the invention. It is intended that all techniques which are equivalent to those described herein in that they perform substantially the same function in substantially the same way to achieve the same result are within the scope of the invention.

I claim:

1. In an electronic animal control apparatus including a strap adapted to be placed entirely around a portion of an animal's body and supporting circuitry producing an electroshock signal in response to a command signal, the improvement including means designed for providing a solution to the problem of avoiding inconsistent electrode contact and loss of electrode stimulus to the animal's skin under conditions of the animal's fur being wet, comprising: first and second electrodes attached to a receiver unit and extending through holes in the strap toward the animal's body, each of the first and second electrodes including an elongated conductive probe connected to the circuitry to receive the electroshock signal, and an insulator surrounding a portion of that electrode for the purpose of preventing shunting of the electroshock signal when the animal's fur is wet, an end portion means of each of the first and second electrodes for extending only sufficiently far beyond the insulator to 1) ensure consistent electrical contact of the first and second electrodes with the animal's skin without overtightening the strap, and 2) avoid substantial shunting of electrical stimulus current between the first and second electrodes through wet fur, the diameter of the end portion means of each of the first and second electrodes having a value sufficient to 1) ensure consistent electrical contact of the first and second electrodes with the animal's skin without overtightening the strap, and 2) avoid substantial shunting of electrical stimulus current between the first and second electrodes through wet fur.

2. In an electronic animal control apparatus including a strap adapted to be placed around a portion of an animal's body and supporting circuitry producing an electroshock signal in response to a command signal, the improvement comprising first and second electrodes attached to the receiver and extending toward the animal's body, each of the first and second electrodes including an elongated conductive probe connected to the control apparatus to receive the electroshock signal, and an insulator surrounding a portion of that electrode, the end portion of that electrode extending from approximately one-eighth to one-quarter of an inch beyond the insulator.

3. The electronic animal control apparatus of claim 2 wherein the diameter of the end portion is about one-eighth of an inch.

4. In an electronic animal control apparatus including a strap adapted to be placed around a portion of an animal's body and supporting circuitry producing an electroshock signal in response to a command signal, the improvement comprising first and second electrodes attached to the receiver and extending toward the animal's body, each of the first and second electrodes including an elongated conductive probe connected to the control apparatus to receive the electroshock signal and an insulator surrounding a portion of that electrode, an end portion of that electrode extending only sufficiently far beyond the insulator to both ensure consistent electrical contact of that electrode with the animal's skin without overtightening the strap and avoid substantial shunting of electrical stimulus current between the first and second electrodes through the animal's fur when wet.

* * * * *